(12) United States Patent
Brandwine

(10) Patent No.: US 9,195,805 B1
(45) Date of Patent: Nov. 24, 2015

(54) ADAPTIVE RESPONSES TO TRICKLE-TYPE DENIAL OF SERVICE ATTACKS

(75) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 302 days.

(21) Appl. No.: 13/315,175

(22) Filed: Dec. 8, 2011

(51) Int. Cl.
  *G06F 12/14* (2006.01)
  *G06F 21/00* (2013.01)
  *G06F 21/12* (2013.01)

(52) U.S. Cl.
  CPC .............. *G06F 21/00* (2013.01); *G06F 21/121* (2013.01)

(58) Field of Classification Search
  CPC . H04L 63/08; H04L 63/1441; H04L 63/1458; H04L 63/1466; G06F 21/30
  USPC .............................. 726/2, 3, 11, 14, 22, 25, 13
  See application file for complete search history.

(56) References Cited

U.S. PATENT DOCUMENTS

| 7,882,560 B2* | 2/2011 | Kraemer et al. ................. 726/22 |
| 2006/0225133 A1* | 10/2006 | Balasubramaniyan et al. 726/22 |
| 2007/0005985 A1* | 1/2007 | Eldar et al. ..................... 713/183 |
| 2007/0209068 A1* | 9/2007 | Ansari et al. .................... 726/13 |
| 2010/0205602 A1* | 8/2010 | Zedlewski et al. ................ 718/1 |

OTHER PUBLICATIONS

The Traceback Method about DoS Attack in Open Grid Computing Environment, Lee et al, IEEE, 2008.*
Automating Intrusion Response via Virtualization for Realizing Uninterruptible Web Services, Huang et al, IEEE, 2008.*

* cited by examiner

*Primary Examiner* — Luu Pham
*Assistant Examiner* — Jahangir Kabir
(74) *Attorney, Agent, or Firm* — Hogan Lovells US LLP

(57) ABSTRACT

Various approaches are provided that are able to mitigate the effects of potential trickle-type denial of service (DoS) attacks or similar occurrences. Connection values such as the maximum number of concurrent connections and the timeout values for new connections can be adjusted dynamically in response to changes in operational state and/or an amount of suspicious activity. The suspicious activity can include, for example, a low rate of packets or bytes per unit time, repetitive small headers, unrecognized headers, and other such information. In some embodiments the changes are made iteratively to minimize the effect of the changes on legitimate requests. After the level of suspicious activity decreases, the connection values can iteratively be readjusted back to normal operational values, in order to minimize any remaining portion of the potential attack.

26 Claims, 5 Drawing Sheets

ADAPTIVE RESPONSES TO TRICKLE-TYPE DENIAL OF SERVICE ATTACKS

BACKGROUND

Various computing devices are accessible over public communication networks, such as the Internet. While such access provides numerous opportunities to organizations utilizing such networks, it also presents substantial risk. For example, denial-of-service (DoS) attacks have become a common way of overloading the capacity of organizations' systems. A DoS attack may involve one or more computers submitting multiple requests to at least one computing resource, such as a Web server, in order to fully occupy the server's capacity, thereby preventing the server from responding to legitimate requests in a timely manner, if at all. For many organizations, such as organizations utilizing the Internet to service customers, preventing servers from responding to legitimate requests can cause significant harm to costs, revenue, and customer goodwill, among other potential problems. Not only is a DoS victim prevented from servicing customers, but the victim may also be responsible for costs to Internet service providers (ISPs) for the increased network traffic attributable to DoS attacks.

As networks such as the Internet have scaled up in capacity, it has become increasingly expensive for conventional. DoS attackers. For example, an attacker attempting to disable a website with 10 Gbit/sec. of network capacity will have to generate 10Gbit/sec. of inbound network traffic. Accordingly, attackers have adjusted the way in which such attacks are carried out. One such type of attack is referred to as a "trickle attack" or "HTTP trickle attack," wherein the number of concurrently available connections is exhausted instead of the processing capacity. A large number of connections is made to a Web server and a continuous stream of headers (e.g., short. HTTP headers) sent at regular, but substantially long, intervals, such as every thirty seconds. Such an approach is much less expensive for the attacker than a conventional DoS attack, but can quickly tie up the number of connections or request processors for the Web server or other such system or service. One approach to mitigating these types of attacks is to use shorter timeout periods for incoming requests. Such an approach can be undesirable in many situations, however, as customers using devices such as smart phones or tablet computers with weak or spotty cellular connections may not be able to have requests completed within the timeout period, which can frustrate customers can cost the providers business.

BRIEF DESCRIPTION OF THE DRAWINGS

Various embodiments in accordance with the present disclosure will be described with reference to the drawings, in which.

DETAILED DESCRIPTION

Figure 1:
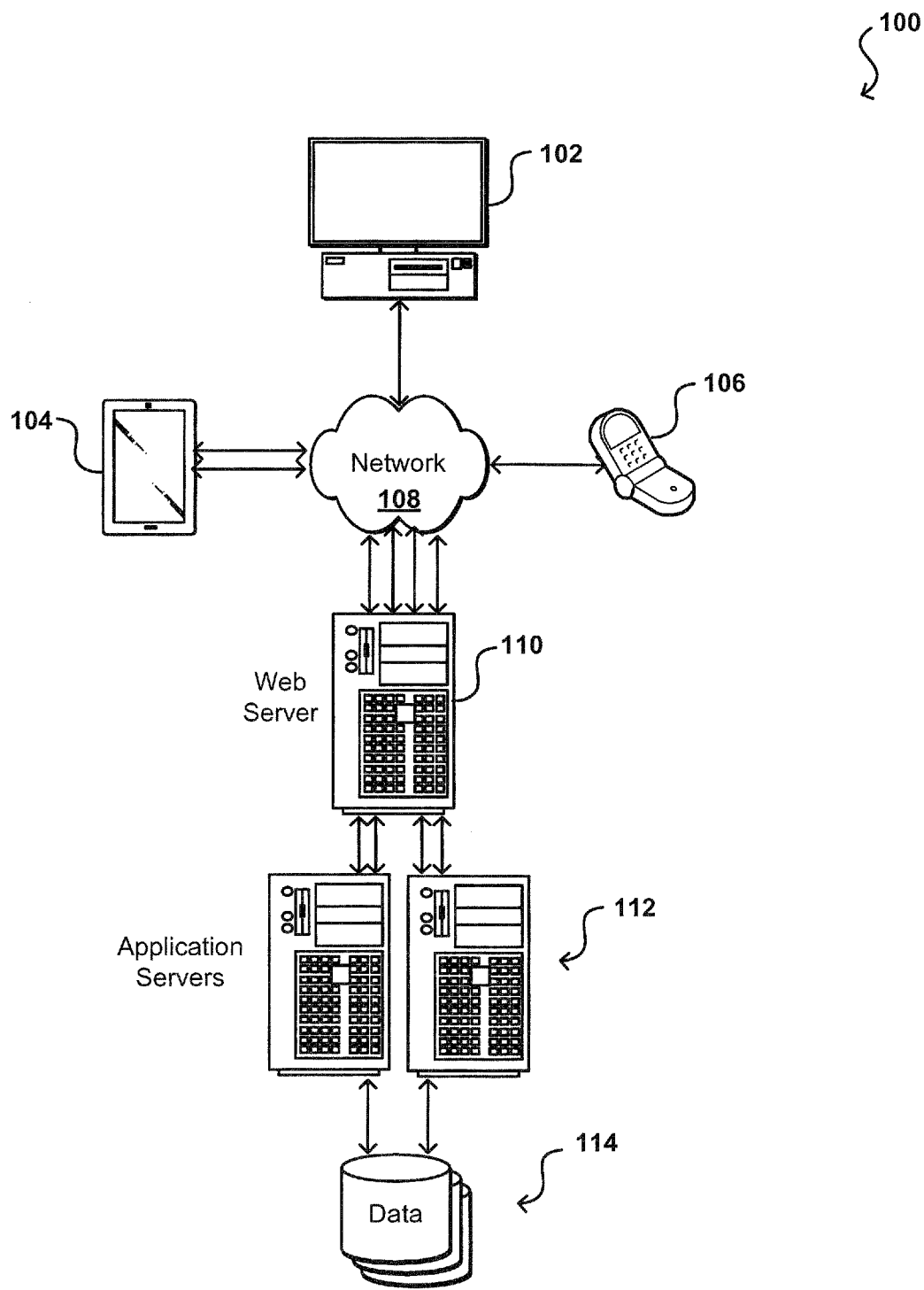
FIG. 1 illustrates an example environment in which various aspects can be implemented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments can overcome one or more of the aforementioned and other deficiencies in existing approaches to preventing or mitigating the effects of trickle-type denial-of-service (DoS) attacks, or similar trickle-style occurrences. In particular, variables such as the maximum number of connections and timeout periods for requests can be adjusted dynamically based on state information observed on a system, device, or resource, such as a Web server or other network device. During periods of typical operation in at least one embodiment, a component such as a Web server can operate using conventional configuration information and settings, such as a standard number of maximum connections and a conventional timeout period for new requests. These values can be selected by an entity such as a resource provider or application owner who is able to specify values for these variables based on typical operational experience, desired levels of performance and availability, and other such information. When the Web server, or a component monitoring the Web server, determines that the number of available connections falls below a determined availability threshold, it can be determined that the Web server is no longer operating in a normal mode of operation. In response, information for the currently established connections can be examined. If a significant number of the established connections exhibit a suspicious behavior, such as by having a low ratio of packets or bytes received per unit time, action can be taken to mitigate the effects of a potential DoS attack. In at least one embodiment, the number of available connections for the Web server can be increased, in order to attempt to have connections available for legitimate use. Further, the timeout value can be decreased for new connections in order to thwart a trickle DoS attack by setting the timeout value to be less than the trickle rate, or at least significantly increase the cost of the attack to the potential attacker. Further, some embodiments can cause early termination of suspicious established connections as well.

Various embodiments also enable a system or service to dynamically recover from such an attempted attack as well. For example, the reduction in timeout values might cause the number of suspicious connections to decrease. Once the number of suspicious connections is back below an allowable number for a period of time, the maximum number of connections can be decreased and the timeout value increased until the Web server or other such component is back at normal operation. In some embodiments, the timeout values and maximum number of connections can be adjusted over time as the state of the connections changes. In other embodiments, there might be specific modes of operation (i.e., a duress mode and a normal operation mode) that a Web server or other component can toggle between based upon the amount of suspicious activity and other such information.

Various other functions and advantages are described and suggested below as may be provided in accordance with the various embodiments.

FIG. 1 illustrates an example of an environment 100 that can take advantage of approaches in accordance with various embodiments. Although a number of components are illustrated, it should be understood that there can be additional and/or alternative components used as known for such environments, such as routing components, firewalls, interfaces, switching fabrics, and the like. Further, like components may have reference numbers carried over between figures for convenience and ease of explanation, but such use should not be interpreted as a limitation on the various embodiments.

The environment 100 illustrated in FIG. 1 illustrates a general configuration wherein users of various computing devices 102, 104, 106 (e.g., smart phones, tablet computers, desktop computers, notebook computers, gaming systems, portable media players, and the like) are able to submit requests to, and receive responses from, a Web server 110 across at least one network 108. The network may include any appropriate network, including an intranet, the Internet, an Ethernet, a local area network (LAN), a cellular network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network includes the Internet, as the environment includes a Web server for receiving requests and serving content in response thereto, although for other networks an alternative device serving a similar purpose could be utilized as would be apparent to one of ordinary skill in the art.

A request received from one of the computing devices can be directed by the Web server 110 to an appropriate application server 112 or other such component operable to perform an action in response to the request, such as may require pulling information from at least one data store 114 associated with a provider of the Web server and application servers. As used herein the term "data store" refers to any device or combination of devices capable of storing, accessing, and/or retrieving data, which may include any combination and number of data servers, databases, data storage devices, and data storage media, in any standard, distributed, or clustered environment. In some configurations, the Web servers themselves might spin off threads and processors to handle requests without delegating to one or more application servers. Various other approaches can be used as well as should be apparent. Such a configuration can be used to enable a provider of an application or Web service to serve multiple requests for different users of various types of computing device.

In such an environment, the Web server 110 can open a thread for each request to be processed, as known in the art. There can be multiple requests being concurrently processed for a user, as indicated by the multiple arrows between one of the computing devices 104 and the network 108. Each request being processed can have its own thread, as indicated by the arrows between the Web server 110 and the application servers 112, where the workload can be distributed such that each application server processes a portion of the threads or requests.

As discussed, the computing device for at least one of the users (knowingly or unknowingly) can attempt a denial of service (DoS) attack on the Web server 110 or application servers 112 by attempting to consume resources such that the provider is unable to provide service to valid clients. While traditional DoS attacks attempt to overwhelm the resources with traffic, the expense of these attacks has led attackers to instead attempt to exhaust available resources using a tickle-type DoS attack. An attacker can cause at least one computing device to establish as many connections as possible with the Web server, for example, and send small packets of information at intervals sufficient to keep each thread or connection active, while sending as little information as possible. For example, a device can send a continuous stream of short HTTP headers at intervals of about every thirty seconds, which can be less than the timeout value of the Web server for processing requests. Due to the small amount of information per unit time that the attacker needs to send, the attacker can maintain hundreds or thousands of these requests using a standard cable modem, for example, to exhaust the request handlers of the Web server without overwhelming the client device used to generate the attack.

A conventional Web server can be configured to handle on the order of, for example, ten to one thousand concurrent threads or requests. The provider of the Web server typically will configure the maximum number of concurrent threads to a number that is high enough to service all (or at least most) legitimate requests during times of high load, while being low enough to prevent the Web server from being overwhelmed if the received requests are very resource intensive to process. In a trickle attack each request consumes an entire thread, but the individual requests are typically very inexpensive for the server to process.

Due at least in part to the fact that the individual trickle attack requests are inexpensive to process, one approach to mitigating the effects of a DoS attack involves dynamically increasing the maximum number of allowable concurrent threads. Such an approach attempts to maintain available threads for legitimate traffic while allowing for some amount of attack traffic. As discussed, suspicious traffic can be terminated early, but may still occupy multiple threads until the suspicious nature can be determined.

Similarly, the timeout values for each new request can be decreased dynamically to attempt to drop threads that originated as part of a DoS attack. In some embodiments, the timeout values can automatically drop to a "duress state" value in order to attempt to quickly thwart a potential attack. In other embodiments, the timeout values might decrease slowly until the amount of suspicious activity decreases to an acceptable level. Such a dynamic approach can help to minimize the occurrence of legitimate users with slow connections having their threads accidentally terminated. When the amount of suspicious activity remains at an acceptable level for at least a minimum recovery period, for example, the timeout value can be slowly increased until either the level of suspicious activity increases beyond an acceptable level or the timeout value is returned to normal. Various other approaches to dynamically increasing and decreasing these or other values can be utilized as well as discussed and suggested elsewhere herein.

Figure 2:
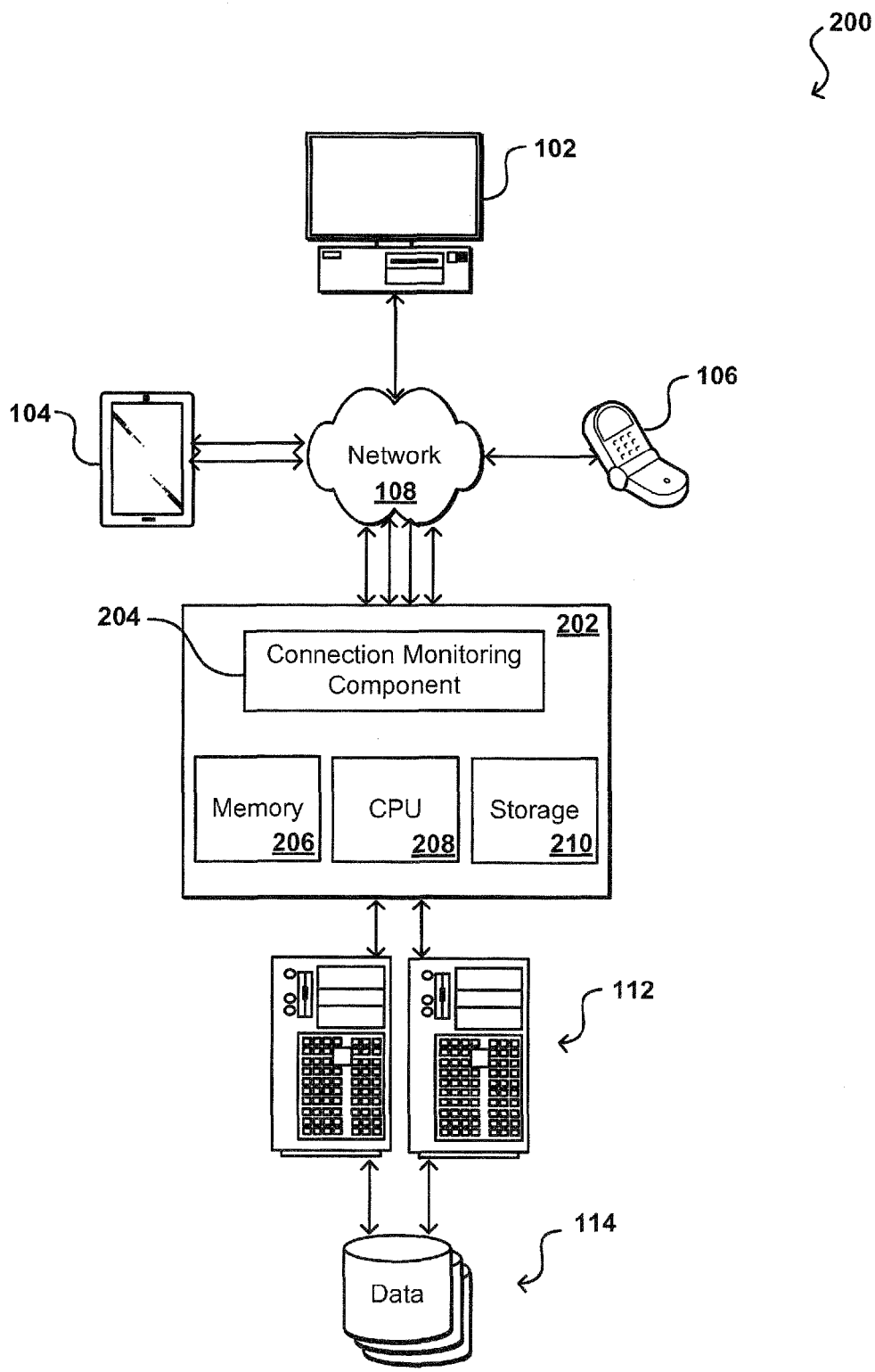
FIG. 2 illustrates a second example environment in which various aspects can be implemented in accordance with various embodiments.

FIG. 2 illustrates an example environment 200 in which such dynamic functionality can be implemented in accordance with various embodiments. In this example, the Web server 202 has a connection monitoring component 204 that is able to monitor an operational state of the Web server, such as to monitor a number of available and utilized connections, as well as an amount of suspicious activity of number of suspicious requests. The connection monitoring component can be any appropriate combination of hardware and/or software for executing instructions to perform monitoring, make value adjustments, and/or perform other tasks discussed and suggested herein. In some embodiments, the connection monitoring component 204 can take the form of a module created through execution of instructions executed by at least one central processing unit (CPU) 208 or other processing element of the Web server.

As discussed, an operator or administrator of the Web server 202 select appropriate values for parameters such as the request timeout value and maximum number of concurrent threads based on factors such as past operational data, target performance criteria, and other such information. In some embodiments, the operator can provide a configuration file that can be stored to a storage device 210 on, or in communication with, the Web server. At startup, or any other appropriate time, the values can be read from the configuration file into resident memory 206 that is accessible to the CPU 208 and/or connection monitoring component 204.

During operation, the Web server can receive requests and, for each request, allocate (i.e., "spin off") a thread that utilizes processing capability of the Web server, an application server, or another such component or device. The connection monitoring component 204 can monitor information about the established connections for received requests, as may include the number of established threads and the number of available connections. As part of the specified configuration information, an operator or administrator might have specified a minimum number of available threads that should be provided, or a ratio of available threads to established threads, or another such metric. This number can be the same number at all times, or there can be different values at different times or under different environmental conditions, etc.

When the connection monitoring component determines that the number of currently available connections is near or below the minimum number or ratio of available threads, or the number of threads is reaching a specified connection limit, etc., the connection monitoring component can determine that the Web server is not operating in a normal mode or state of operation and can attempt to take remedial action. In at least some embodiments, the connection monitoring component can examine information for at least a portion of the established connections to attempt to identify suspicious behavior or activity. Suspicious behavior can include any behavior that falls outside the bounds of conventional, legitimate activity, such as may include a low ratio of packets or bytes received per unit time, a lack of variation in packet size, an unexpected variance in packet arrival times (i.e., lack of variation), a lack of variation in header information, and the like. There might be instances, such as the streaming of large media files, wherein there might be a relatively low number of packets or bytes received per unit time, such that it can be desirable to allow for a certain amount of potentially suspicious behavior. When the number of potentially suspicious threads or requests exceeds an allowable value, however, the connection monitoring component can attempt to adjust one or more values to prevent or mitigate a potential trickle-type DoS attack (or other such undesirable occurrence).

Figure 3:
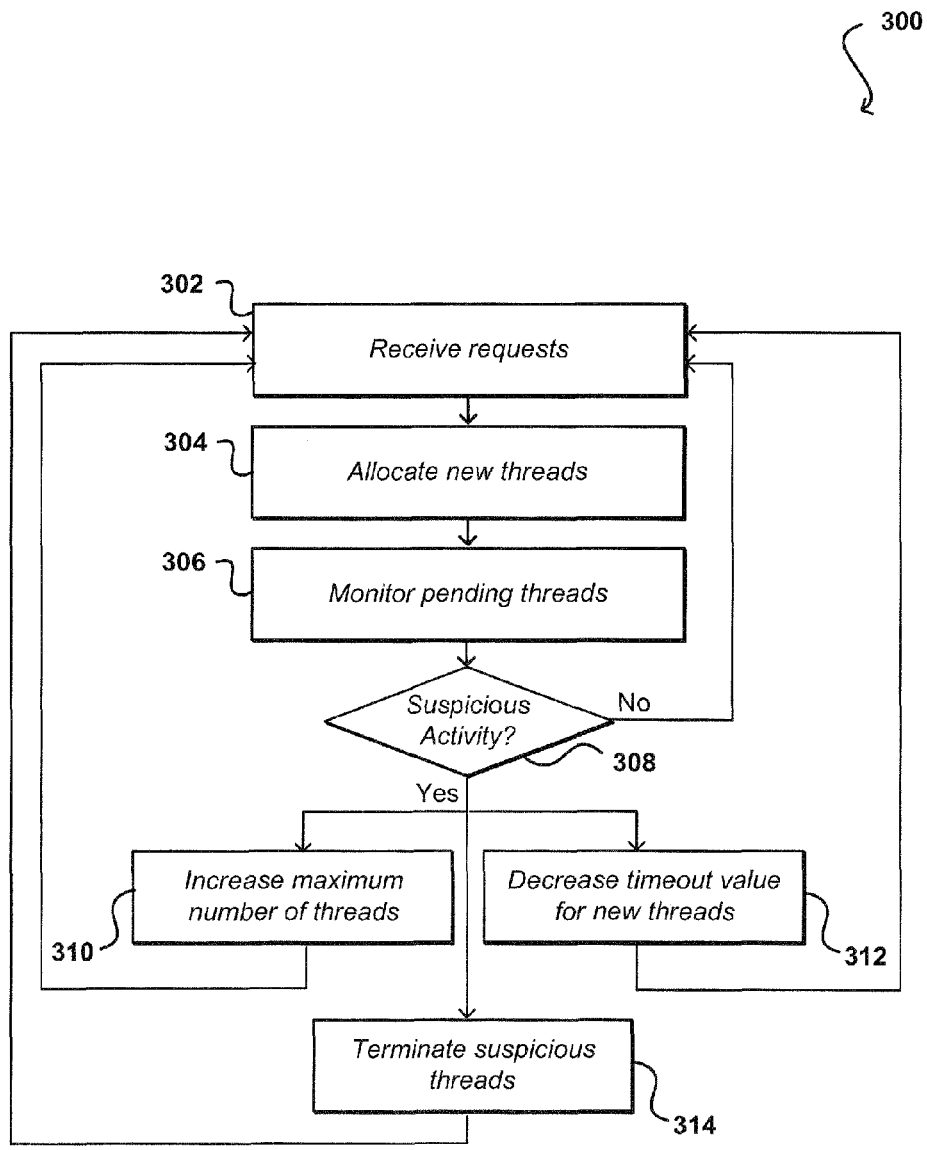
FIG. 3 illustrates an example process for adjusting connection parameters to mitigate a potential trickle DoS attack that can be utilized in accordance with various embodiments.

FIG. 3 illustrates an example process 300 for mitigating a potential trickle DoS attack that can be used in accordance with various embodiments. It should be understood that, for any process discussed herein, there can be additional, fewer, or alternative steps performed in similar or alternative orders, or in parallel, within the scope of the various embodiments unless otherwise stated. It also should be understood that steps of the method can be performed by a single system or service (e.g., a multi-threaded server), but that specific steps of the process can be performed by different threads or components, such as where one thread assigns threads to received requests, another thread monitors information about those threads, and another thread actually manages the processing of a request. In this example, a device such as a Web server receives 302 requests from any of a plurality of different users, systems, applications, devices, or other such sources. In some embodiments the source of the request may have to be authenticated, while in other embodiments a request can be received and processed from any potential source (unless blacklisted, etc.). For each new request, or at least each new request meeting at least one acceptance criterion, a new thread can be allocated 304, with threads for requests that have completed and/or been acknowledged being closed. The opening and closing of threads can be performed concurrently in at least some embodiments. The pending threads can be monitored 306 by any appropriate component, device, or service, such as a connection monitoring component as discussed with respect to FIG. 2. The monitoring component can attempt to determine 308 whether any activity with respect to the pending threads is suspicious. As discussed, in some embodiments the monitoring component might allow threads to be processed as long as various criteria are met, such as maintaining at least a minimum number or ratio of available threads, having an acceptable ratio of slow threads to fast threads, etc. If at least one of these criteria is not met, or is approaching an unacceptable value, the monitoring component can look at information such as the average ratio of packets per unit time received on the threads or the average ratio of bytes per unit time received on the threads. In some embodiments, the component might determine such information for each thread, a sampling of threads, an average of the threads, or another such selection. If no suspicious activity is detected, the system can continue as normal.

If suspicious activity is detected, and that suspicious activity exceeds an allowable amount of suspicious activity, the monitoring component, Web server, or another appropriate component can attempt to take remedial action. As discussed, in some embodiments this can involve switching to a duress mode, or similar mode of operation, where the maximum number of threads is increased to a specific value and the timeout period for new threads is decreased to a particular value. Such embodiments might provide for bi-modal operation, where the server is in a "normal" operation mode or a "duress" mode, with specific thread and timeout values for each mode.

In this example the approach is more of an incremental approach to attempt to mitigate a potential attack while minimizing the potential negative impact on legitimate requests that might have slow connections or otherwise exhibit potentially suspicious behavior. In this example, a component such as a connection monitoring component can increase 310 the maximum number of threads and/or decrease 312 the timeout value for new threads. The connection monitoring component can also terminate 314 any suspicious thread at any time during the handling of that thread. In some embodiments, the changes can be done concurrently, with an increase in maximum thread count and a decrease in timeout value being performed together after a previous setting resulted in an unacceptable amount of suspicious activity for at least a specified period of time. In some embodiments, a component might attempt to adjust the maximum number of threads first, to attempt to minimize impact on legitimate traffic, at least up to a certain amount, and then decrease the timeout value to attempt to terminate suspicious threads. Any appropriate combination of adjustments can be used as appropriate. In some embodiments the values can only be adjusted by a certain amount. In other cases the values can keep being adjusted until the level of suspicious activity is again acceptable, as at some point the timeout value will be so short as to cause almost any request to be terminated. Various other limits or approaches can be used as well. The adjustment in values can be made until the levels of suspicious activity are again acceptable or a criterion is reached where another type of action should be taken, such as to terminate all suspicious threads before completion, terminate all pending threads, etc.

A similar process can be used to recover from a potential trickle DoS attack as well in various embodiments. In embodiments where the system switches to a duress mode, for example, the system can switch back to a normal mode of operation when the level of suspicious activity falls back to within an acceptable level for at least a minimum period of time.

Figure 4:
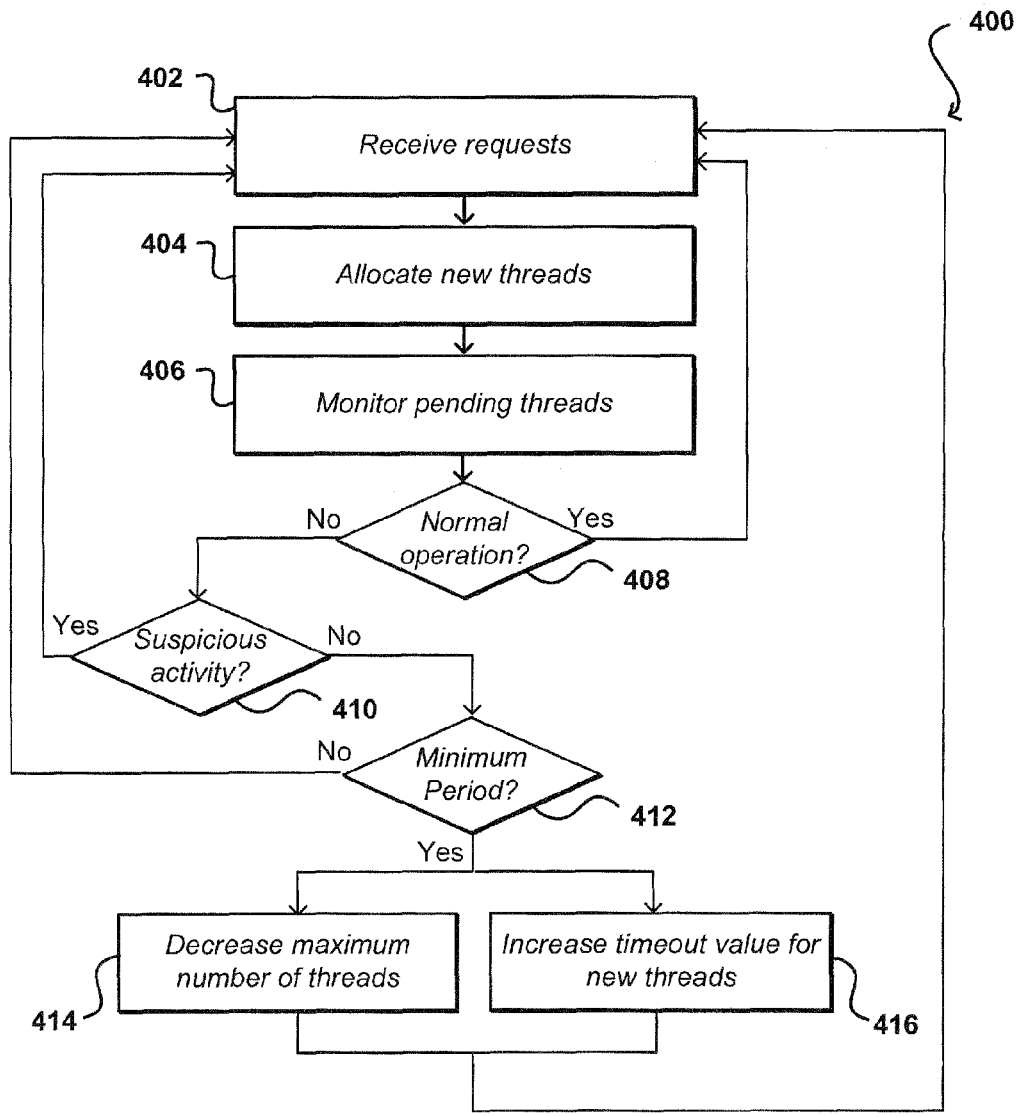
FIG. 4 illustrates an example process for adjusting connection parameters back to a typical operational state for current conditions that can be utilized in accordance with various embodiments.

FIG. 4 illustrates an example process 400 for recovering from a potential trickle DoS attack that can be performed in accordance with various embodiments. This example assumes that one or more values were adjusted to mitigate the DoS attack as discussed with respect to the process of FIG. 3. In this example, the system, service, or device (e.g., the Web server) receives 402 requests, allocates 404 new threads and closes completed threads, and monitors 406 pending threads as discussed above. If the system is determined 408 to have returned to a normal operation mode or typical state of operations for current conditions, the process can continue with the current settings. If the system is not yet in a normal operational state, a determination 410 can be made as to whether there is still an unacceptable level of suspicious activity in the pending threads. If there is still an unacceptable amount, the process can continue with the mitigation settings discussed above until the level of suspicious activity drops to within acceptable levels. If the suspicious activity is no longer at an unacceptable level, a determination 412 can be made as to whether the level of suspicious activity has been acceptable for at least a minimum period of time. If not, the process can continue with the current values or settings to attempt to prevent an increase in suspicious activity. Once the level of suspicious activity is within an acceptable range for at least a minimum period of time, as may be configured by an operator or administrator, for example, one or more of the thread settings can be adjusted. In this example, the maximum number of threads can be decreased 414 and/or the timeout value for new threads can be increased 416. As discussed above, the values can be adjusted together or separately in any appropriate order and by any appropriate amount. In at least some embodiments, the values can be adjusted iteratively, with each adjustment needing to have an acceptable level of suspicious activity for a minimum period of time before another adjustment can be made. The process can continue until the values are back to the normal or typical settings, for example, such that the system is back operating in a normal mode of operation.

As discussed, it can be desirable to balance the adjustments in the number of threads and the timeout values. Increasing the maximum number of threads can potentially bog the server down due to the number of concurrent threads that must be managed. However, certain slow clients or spotty connections might not be able to send packets reliably every twenty seconds, and it can be undesirable to terminate the thread for such a legitimate user. For customer experience reasons it can be desirable to push timeouts to be relatively long, but for DOS resilience purposes it can be desirable to push timeouts down. Various analytics can be used to attempt to further analyze each thread to determine a level of the suspicious nature of that thread such that the threads might be handled individually rather than adjusting the timeout values down below a desired level. For example, if the standard deviation of packet arrival time is very low and the interval between packets is very high, it can reasonably be inferred that the packets are spaced apart due to a timer or other application and not network delay or jitter. If a connection is receiving a steady stream of packets that are all the same size and all below the maximum transmission unit (MTU) in size, that also can be an indication of suspicious activity, as for normal traffic the requests will vary in size and go up to the MTU in size to the extent possible or practical. Even for traffic such as the streaming of content, the packets will be primarily of the same size but will be mostly at the MTU in order to provide the content as quickly as possible. A series of similar headers that are below the MTU can be an indicator that something is wrong.

In some embodiments, a connection monitoring component can determine a measure of a speed for individual connections, as may be measured in bytes per second, packets per second, or another such metric. The component can utilize a scoring approach wherein connections can be categorized as "fast" or "slow" connection. If the number of slow connections is small with respect to the total number of connections, the server can run with very large timeout values in order to serve customers with very poor or unreliable connections. As the server begins to become stressed and the ratio of slow connections to fast connections increases, the timeout value can be decreased such that new connections that are part of a potential trickle DoS attack will be terminated within the new timeout period.

An advantage of various approaches discussed herein is that the approaches can be added to an existing server, such as a Tomcat server. Logic can be added to a Web server, for example, to manage the connection pools, timeout values, and other such aspects. Instead of relying on static values from a configuration file, the values in memory can be adjusted dynamically in response to the state of the server. Any of a number of interfaces can be used to implement such functionality, as may include a call to an application programming interface (API), a dynamic updating of a configuration file, a writing of information to a Unix domain socket, etc. Various new values can also be specified, such as an absolute maximum thread count of 20,000 regardless of operation state, the allowable ratio of active threads to available threads before the server is determined to be under stress, etc. The information used to determine current values and ratios can include any appropriate data, such as trailing average, recent samples, or any of a number of statistical ways of analyzing the data. In other embodiments, the functionality can be built into the Web server or other such component. In some embodiments a monitoring component can be polled to determine a percentage of the thread pool that is active, while in other embodiments one or more flags can be setup to notify or take action when a certain ratio or value is reached.

A system can also be configured to look for other types of suspicious activity as well in various embodiments. For example, a Web server can analyze the traffic to determine headers that are commonly received. A database or library can be established showing a number of headers that are very common, as well as a number of headers that occur on a somewhat regular basis. If there are a number of threads with a large number of different and unique headers that are not recognized, those threads can be flagged as suspicious connections. In some embodiments a library of common headers can be obtained, which can be updated over time with headers actually seen by the Web server. In some embodiments, these header entries can be decayed such that headers that are no longer encountered can be dropped from the library. In some embodiments, there might be protocol specific libraries, such as a library of headers for HTTP requests and a library for SMTP requests, etc.

Figure 5:
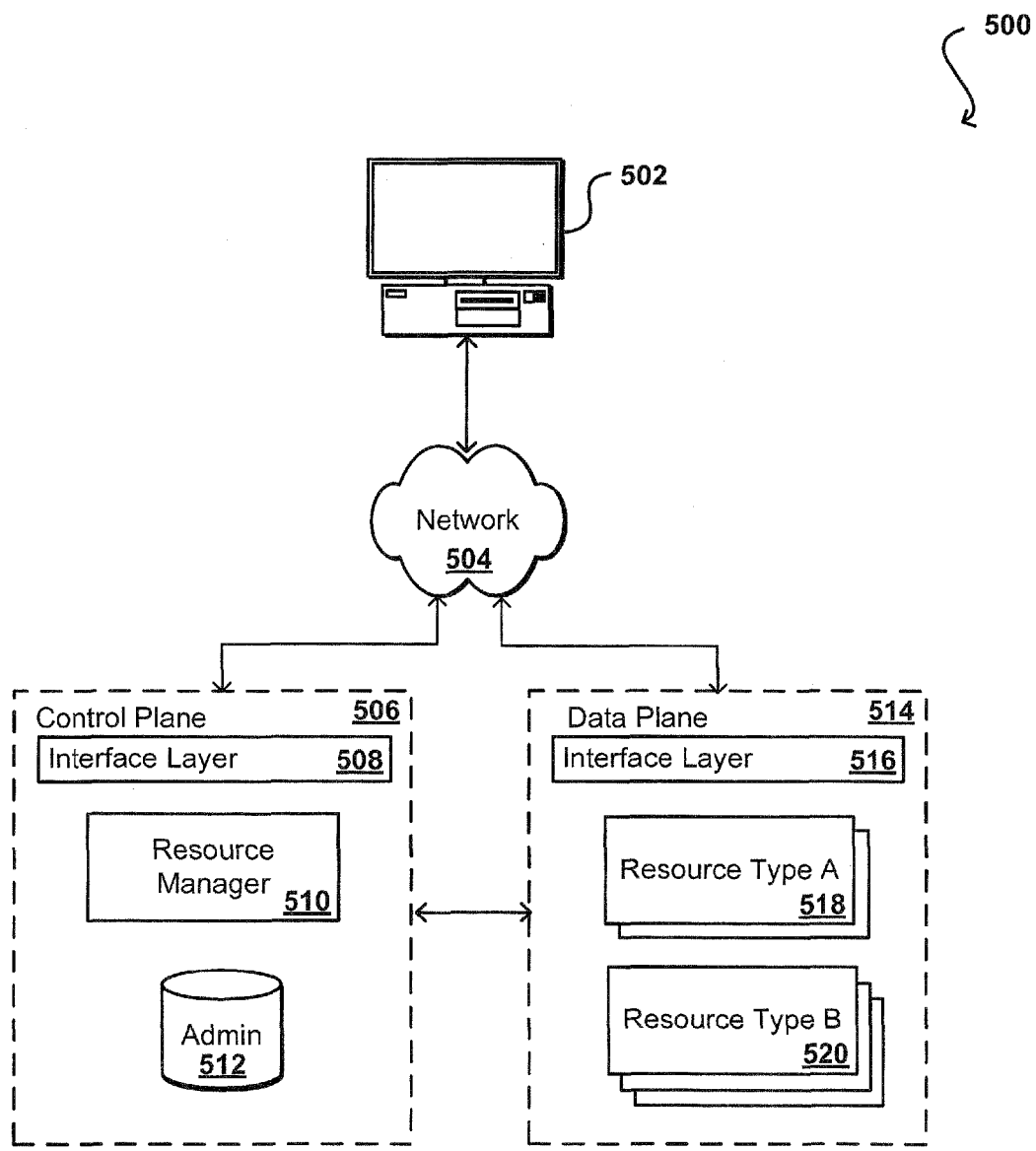
FIG. 5 illustrates a third example environment in which various aspects can be implemented in accordance with various embodiments.

FIG. 5 illustrates an example of another environment 500 that can be used to provide users with concurrent access to one or more shared and/or multi-tenant resources while mitigating the effects of potential trickle DoS attacks in accordance with various embodiments. In this example, a computing device 502 for an end user is shown to be able to make calls through at least one electronic network 506 (e.g., a local area network, cellular network, or the Internet) to be able to perform tasks such as to provision data repositories, request dedicated computing capacity, utilize data instances, or otherwise submit requests relating to one or more resources. In this particular example the provider environment is divided into two logical areas, a control plane 506 and a data plane 514. It should be understood, however, that various other environments and configurations can be used as well to implement aspects of the various embodiments. In this example environment, an end user computing device 502 can submit management, configuration, or other such requests to the control plane 506, which can manage tasks such as provisioning instances and managing access rights. In at least some embodiments, computing, data, and other such resources for a customer account reside in the data plane 514, such that once a user has access to a resource the user can submit requests directly to the data plane 514 without having to go through the control plane 506. While computing devices are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

As mentioned, the control plane 506 in this example is essentially a virtual layer of hardware and software components that handles control and management actions, such as provisioning, scaling, replication, etc. The control plane in this embodiment includes an interface or Web services layer 508, or tier, which can include at least one Web server, for example, along with computer-executable software, application servers, and/or other such components. The Web services layer can include a set of application programming interfaces (APIs) or other such interfaces for receiving Web service calls or other such requests from across the network 504. Each API can be provided to receive requests for at least one specific action to be performed with respect to the data environment, such as to provision, reserve, scale, clone, or hibernate an instance of a resource. An interface layer 508 in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses.

The control plane 506 in this embodiment also includes at least one resource manager 510, or management component or process. When a resource such as a data instance is created in the data plane, information for the instance can be written to an administration data store 512 or other such location in the control plane. The resource manager can access the information in the data store to determine active resource types 518, 520 in the data plane 514. The resource manager 510 can pull other information from the admin data store as well, such as configuration information to use in providing threads for requests received to one or more of the resource types. A management component can monitor the connections to one or more resource types or instances in the data plane 514, and make adjustments to the thread parameters for those resources.

As discussed, once an instance or resource is provisioned and a customer or user is provided with a DNS address or other address or location, requests can be sent "directly" to the data plane 514 through the network 504, using a Java Database Connectivity (JDBC) or other such client, to directly interact with those resources 518, 520. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a computing device 502 can be directed to a network address translation (NAT) router, or other appropriate component or part of the interface layer 516, which can direct the request to the actual instance or host corresponding to the DNS of the request. As discussed, such an approach allows for instances to be dynamically moved, updated, replicated, etc., without requiring the user or application to change the DNS or other address used to access the instance. In at least one embodiment, the functionality of the control plane can be offered as at least one service by a provider that may or may not be related to a provider of the data plane, but may simply be a third-party service that can be used to provision and manage data instances in the data plane, and can also monitor and ensure availability of those instances in a separate data plane.

In this example, the resource manager 510 in the control plane can monitor the active threads in the data plane, and can adjust the connection parameters in response to changes in state as discussed elsewhere herein. In some embodiments, each type of resource might have a different set of connection values, and might have different settings for determining a state of duress, an acceptable amount of suspicious activity, and the like. The resource manager can cause the parameter values to be adjusted, monitor the results, and make further changes as necessary. In some embodiments, the resource manager might be provided by a different entity than the resources, and in some embodiments the resource manager might be a service offered by a third party. Various other arrangements can be used as well within the scope of the various embodiments.

As should be apparent to one of ordinary skill in the art in light of the present disclosure, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser, It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate non-transitory media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for mitigating effects of a trickle-type denial of service (DoS) attack, under the control of one or more computer systems configured with executable instructions, the method comprising:
   receiving a plurality of requests to a Web server;
   providing, by the Web server, a processing thread for each of the plurality of requests;
   monitoring utilization of at least one resource related to the provided processing threads;
   monitoring at least one parameter for the provided processing threads;
   in response to the monitored at least one parameter being indicative of a potential trickle-type DoS attack capable of depleting concurrently available connections to the Web server, (a) iteratively increasing a maximum number of concurrent threads to the Web server by adjusting the maximum number after an amount of time elapses, and (b) iteratively decreasing a timeout value for any new threads by adjusting the timeout value after the amount of time elapses until the monitored utilization of the at least one resource is below a determined utilization threshold for at least a determined minimum period of time; and
   iteratively decreasing the maximum number of concurrent threads and/or iteratively increasing a timeout value for new threads to normal operational settings when the monitored utilization is below the determined utilization threshold for at least the determined minimum period of time,
   wherein the concurrently available connections are based at least in part on Web server resources allocated to handle established connections and pending connections to the Web server.

2. The computer-implemented method of claim 1, wherein each iterative decrease of the maximum number of concurrent threads and each iterative increase of a timeout value for new threads occurs after the monitored utilization of the at least one resource is below a determined utilization threshold for at least the determined minimum period of time for a previous maximum number of concurrent threads and a previous timeout value.

3. The computer-implemented method of claim 1, wherein the monitored at least one parameter includes at least one of a ratio of different data transfer rates, a ratio of available threads to established threads, a ratio of packets received per thread per unit time, an amount of variance in the packets received per thread per unit time, a ratio of bytes received per thread per unit time, an amount of variation in packet size, an amount of variation in header information, or an amount of unrecognized header information.

4. The computer-implemented method of claim 1, further comprising:
   terminating, by the Web server, the handling of a request found to be indicative of a trickle-style DoS attack.

5. The computer-implemented method of claim 1, wherein processing thread for each of the plurality of requests includes generating a new thread for each request or assigning a thread for each request from a managed thread pool.

6. A computer-implemented method for dynamically adjusting connection parameters, under the control of one or more computer systems configured with executable instructions, the method comprising:
   receiving a plurality of requests to be processed to a server;
   assigning a processing thread for each of at least a portion of the plurality of requests, up to a maximum number of concurrent threads;
   monitoring at least one parameter for the assigned processing threads;
   in response to the monitored at least one parameter being indicative of illegitimate activity for at least a portion of the plurality of requests, the illegitimate activity capable of depleting concurrently available connections to the server, (a) iteratively increasing the maximum number of concurrent threads to the server by adjusting the maximum number after an amount of time elapses, and (b) iteratively decreasing a timeout value for any new threads by adjusting the timeout value after the amount of time elapses until the monitored utilization of the at least one resource is below a determined utilization threshold for at least a determined minimum period of time; and
   iteratively decreasing the maximum number of concurrent threads and/or iteratively increasing a timeout value for new threads to normal operational settings when the monitored utilization is below the determined utilization threshold for at least the determined minimum period of time,
   wherein the concurrently available connections are based at least in part on server resources allocated to handle established connections and pending connections to the server.

7. The computer-implemented method of claim 6, wherein the number of available threads is able to be increased and the timeout value is able to be decreased to optimize at least one of a number of requests handled per unit time or an average amount of resources needed to process each request.

8. The computer-implemented method of claim 6, further comprising:
   in response to the monitored at least one parameter being indicative of illegitimate activity for at least a portion of the plurality of requests, further causing early termination of any of the requests indicative of illegitimate activity.

9. The computer-implemented method of claim 6, wherein the monitored at least one parameter includes at least one of a ratio of different data transfer rates, a ratio of available threads to established threads, a ratio of packets received per thread per unit time, an amount of variance in the packets received per thread per unit time, a ratio of bytes received per thread per unit time, an amount of variation in packet size, an amount of variation in header information, or an amount of unrecognized header information.

10. The computer-implemented method of claim 6, wherein the maximum number of concurrent threads is increased directly to a first duress value and the timeout value for new threads is decreased directly to a second duress value.

11. The computer-implemented method of claim 6, wherein the maximum number of concurrent threads and the timeout value for new threads are adjusted iteratively until utilization of at least one resource used to process the threads is below a determined utilization threshold.

12. The computer-implemented method of claim 6, wherein the maximum number of concurrent threads and the timeout value for new threads are able to be adjusted back to default values specified in a configuration file.

13. The computer-implemented method of claim 6, wherein the at least one parameter for the assigned processing threads is monitored for all established threads in combination, each established thread individually, or a sub-set of the established threads.

14. The computer-implemented method of claim 6, further comprising:
monitoring headers received through the plurality of requests; and
generating a set of common request headers.

15. The computer-implemented method of claim 14, wherein the at least one parameter indicative of unintended activity includes a number of request headers not included in the set of common request headers.

16. The computer-implemented method of claim 6, wherein the at least one parameter indicative of unintended activity includes a ratio or percentage of packets of a common size less than a maximum transmission size.

17. A computer-implemented method for mitigating effects of a trickle-type denial of service (DoS) attack, under the control of one or more computer systems configured with executable instructions, the method comprising:
receiving a plurality of requests to a Web server operating in a normal mode;
assigning, by the Web server, a processing thread for each of the plurality of requests;
monitoring at least one parameter for the assigned processing threads for at least a determined minimum period of time;
operating the Web server in a duress mode in response to the monitored at least one parameter being indicative of a potential trickle-type DoS attack capable of depleting concurrently available connections to the Web server, operating in the duress mode including (a) iteratively increasing a maximum number of concurrent threads to the Web Server by adjusting the maximum number after an amount of time elapses, and (b) iteratively decreasing a timeout value for any new threads by adjusting the timeout value after the amount of time elapses until the monitored utilization of the at least one resource is below a determined utilization threshold for at least a determined minimum period of time; and
iteratively decreasing the maximum number of concurrent threads and/or iteratively increasing a timeout value for new threads to normal operational settings when the monitored utilization is below the determined utilization threshold for at least the determined minimum period of time,
wherein the concurrently available connections are based at least in part on Web server resources allocated to handle established connections and pending connections to the Web server.

18. The computer-implemented method of claim 17, further comprising:
monitoring utilization of at least one resource related to the assigned processing threads; and
returning the Web server to operate in the normal mode when the monitored utilization of the at least one resource is below a determined utilization threshold for at least the determined minimum period of time.

19. The computer-implemented method of claim 17, wherein the monitored at least one parameter includes at least one of a ratio of different data transfer rates, a ratio of available threads to established threads, a ratio of packets received per thread per unit time, an amount of variance in the packets received per thread per unit time, a ratio of bytes received per thread per unit time, an amount of variation in packet size, an amount of variation in header information, or an amount of unrecognized header information.

20. A computer system, comprising:
at least one hardware processor; and
memory including instructions that, when executed by the at least one hardware processor, cause the computer system to at least:
receive a plurality of requests to be processed;
allocate a processing thread for each of the plurality of requests up to a maximum number of concurrent threads;
monitor at least one parameter for the allocated processing threads for at least a determined minimum period of time;
in response to the monitored at least one parameter being indicative of malicious activity for at least a portion of the plurality of requests, the malicious activity capable of depleting concurrently available connections to the computer system, (a) iteratively increasing the maximum number of concurrent threads to the computer system by adjusting the maximum number after an amount of time elapses, and (b) iteratively decreasing a timeout value for any new threads by adjusting the timeout value after the amount of time elapses until the monitored utilization of the at least one resource is below a determined utilization threshold for at least a determined minimum period of time; and
iteratively decreasing the maximum number of concurrent threads and/or iteratively increasing a timeout value for new threads to normal operational settings when the monitored utilization is below the determined utilization threshold for at least the determined minimum period of time,
wherein the concurrently available connections are based at least in part on computer system resources allocated to handle established connections and pending connections to the computer system.

21. The computer system of claim 20, wherein the maximum number of concurrent threads and the timeout value for new threads able to be adjusted back to default operational values.

22. The computer system of claim 20, wherein the number of available threads is able to be increased and the timeout value is able to be decreased to optimize at least one of a number of requests handled per unit time or an average amount of resources needed to process each request.

23. The computer system of claim 20, wherein the instructions when executed further cause the computer system to:
cause early termination of any of the requests indicative of illegitimate activity in response to the monitored at least one parameter being indicative of illegitimate activity for at least a portion of the plurality of requests.

24. A non-transitory computer-readable storage medium having stored thereon instructions executable by one or more processors of a computer system that, when executed by the one or more processors, cause the computer system to at least:
receive a plurality of requests to be processed;

assign a processing thread for each of the plurality of requests up to a maximum number of concurrent threads;

monitor utilization of at least one resource related to the assigned processing threads;

monitor at least one parameter for the assigned processing threads; and in response to the monitored at least one parameter being indicative of unintended activity for at least a portion of the plurality of requests, the unintended activity capable of depleting concurrently available connections to the computer system, (a) iteratively increasing the maximum number of concurrent threads to the computer system by adjusting the maximum number after an amount of time elapses, and (b) iteratively decreasing a timeout value for any new threads by adjusting the timeout value after the amount of time elapses until the monitored utilization of the at least one resource is below a determined utilization threshold for at least a determined minimum period of time; and iteratively decreasing the maximum number of concurrent threads or iteratively increasing a timeout value for new threads to normal operational settings when the monitored utilization is below the determined utilization threshold for at least the determined minimum period of time, wherein the concurrently available connections are based at least in part on computer system resources allocated to handle established connections and pending connections to the computer system.

25. The non-transitory computer-readable storage medium of claim 24, wherein the instructions when executed further cause the computer system to:

terminate handling of a request found to be indicative of unintended activity.

26. The non-transitory computer-readable storage medium of claim 24, wherein the monitored at least one parameter includes at least one of a ratio of different data connection rates, a ratio of available threads to established threads, a ratio of packets received per thread per unit time, an amount of variance in the packets received per thread per unit time, a ratio of bytes received per thread per unit time, an amount of variation in packet size, an amount of variation in header information, or an amount of unrecognized header information.

\* \* \* \* \*